United States Patent

[11] 3,595,555

| [72] | Inventor | Gordon N. Cameron<br>1322 Hampton, Grosse Pointe Woods,<br>Mich. 48236 |
|---|---|---|
| [21] | Appl. No. | 823,412 |
| [22] | Filed | May 9, 1969 |
| [45] | Patented | July 27, 1971 |

[54] WORK HOLDER
7 Claims, 10 Drawing Figs.

[52] U.S. Cl. ................................................ 269/20,
269/22, 269/275, 24/243 HS
[51] Int. Cl. ...................................................... B23q 3/08,
B25b 5/16
[50] Field of Search............................ 269/20, 22,
275; 24/243.16

[56]  References Cited
UNITED STATES PATENTS

| 2,396,413 | 3/1946 | Egger | 269/22 X |
| 3,202,432 | 8/1965 | Cameron | 279/4 |
| 3,323,424 | 6/1967 | Sykes | 269/20 X |
| 3,433,699 | 3/1969 | Rumble | 269/22 X |
| 3,512,756 | 5/1970 | Cleland | 269/22 X |

*Primary Examiner—*
*Assistant Examiner—*Donald D. Evenson
*Attorney—*Farley, Forster & Farley ABSTRACT: A hydraulically actuated expanding flat holder for workpieces, tools, and the like which includes a holder body member formed to include a pressurized chamber area which has a slotted flat plate thereover and a pressure-responsive pad in the chamber area and next adjacent thereto that will cause and maintain deflection of the slotted area of the plate, out of its normal plane, without loss of the actuating pressure in the holder body chamber area.

PATENTED JUL 27 1971 3,595,555
SHEET 1 OF 2
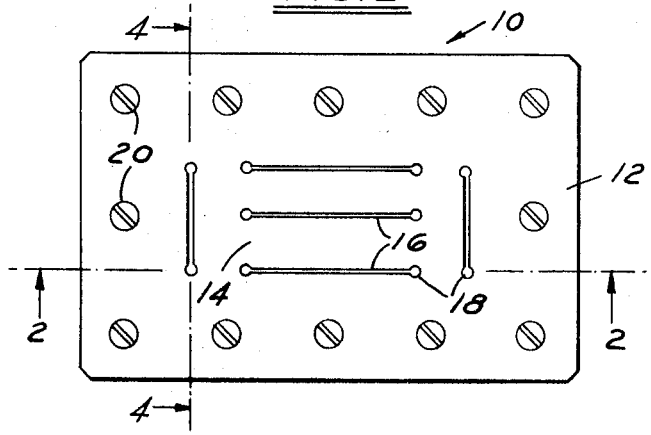
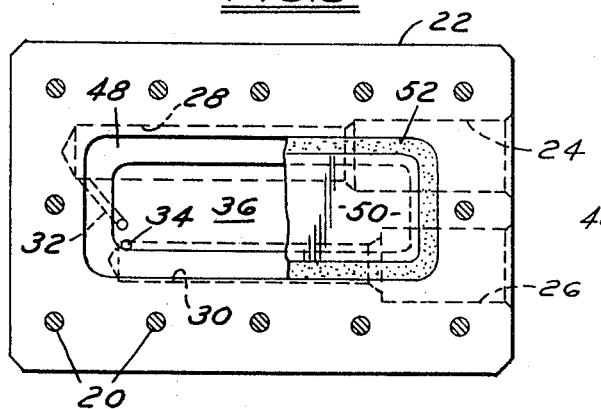
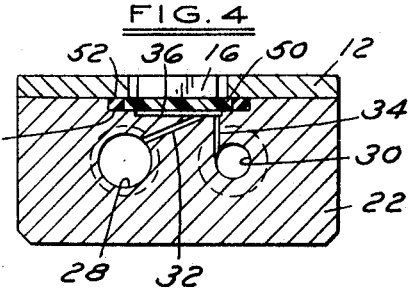
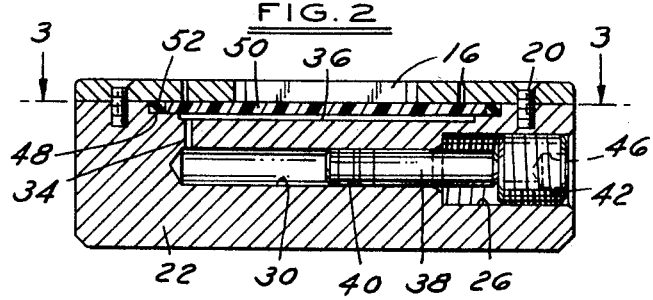
INVENTOR
GORDON N. CAMERON
BY Farley, Forster & Farley
ATTORNEYS

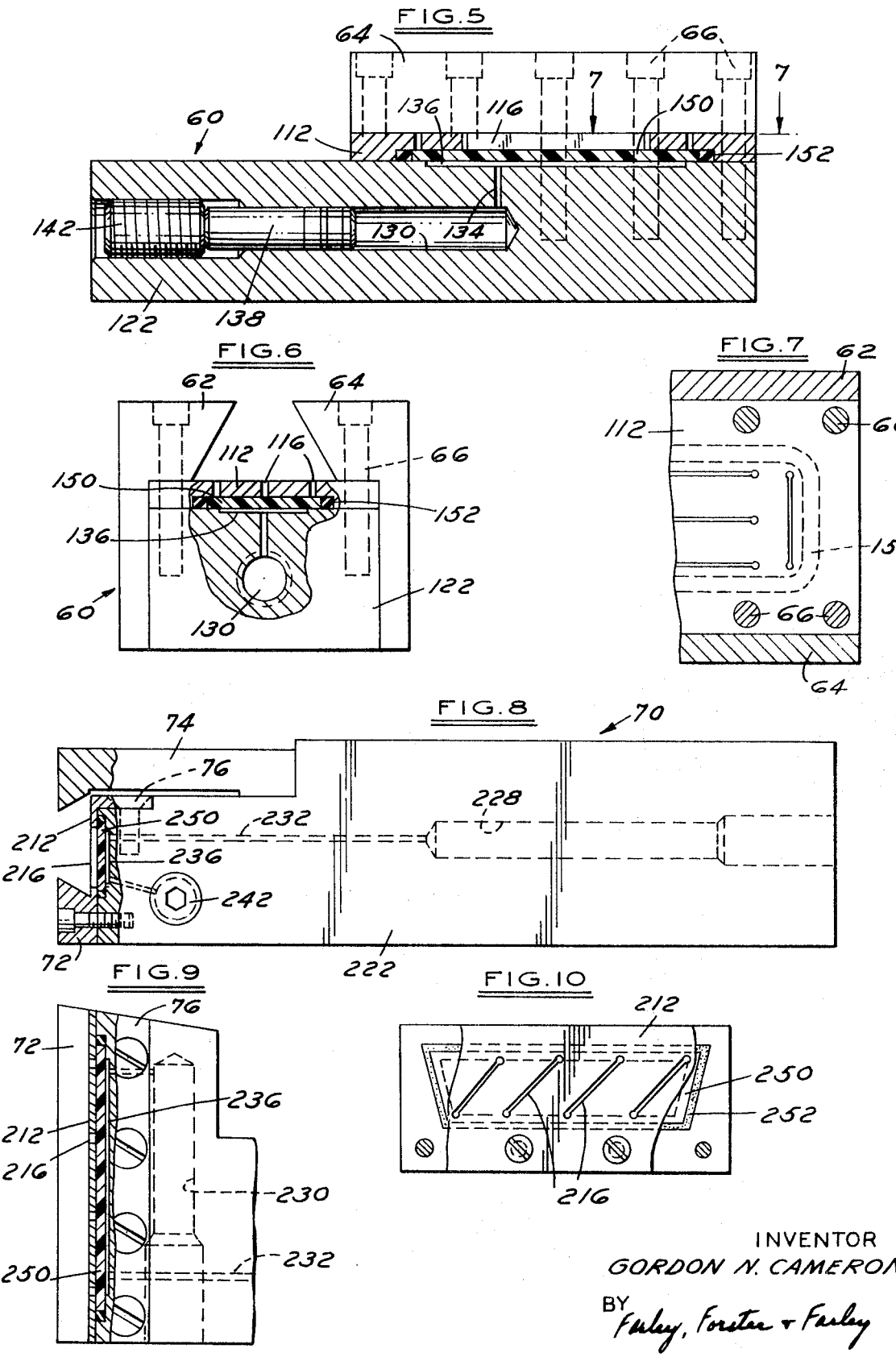

WORK HOLDER

BACKGROUND OF THE INVENTION

Hydraulically actuated chucks and arbors are known for locating and holding external and internal cylindrical workpieces or tool elements, as for example in U.S. Pat. No. 3,202,432 in the name of the present inventor, wherein fluid pressure is used to cause enlargement of an expansible sleeve element.

Such tools have proven very successful for their intended purpose; however, notwithstanding a long-existing need, no comparable means has been provided heretofore whereby a normally flat surface can be raised or in some way actuated to serve a tight holding use; as in a work vice, as a clamping means in a dovetail slot, or other restrictive area, such as a flat brakeshoe, or the like.

The solution to this problem is not readily apparent since the sealing adaptations in a sleeve arrangement, such as in hydraulically actuated chucks and arbors, are not applicable to an expansible flat surface, nor are the strength and recovery advantages present such as in collars, sleeves, etc. where force and stress distributions are more uniform.

SUMMARY OF THE INVENTION

The present invention relates to hydraulically actuated holders, for tools and workpieces or the like, and in particular to an expansible flat which enables confined parallel surfaces to forcefully grip and retain in locked condition relatively movable confining workpiece walls.

The expanding flat of the present invention includes a holder body, a flat plate mounted on the holder body and having a center area which is suitably slotted to allow deflection out of its normal plane, a pressure chamber area in the holder body under the slotted area of the plate, and a member in the chamber area which is responsive to pressure conditions applied for sealing and acting against the slotted area of the plate to cause its deflection into a work-holding position.

The pressure-responsive member is preferably a pad of nylon or like material which is itself capable of deflection, in response to fluid pressure conditions. This enables it to more evenly distribute the pressure load to the slotted area of the plate, and to follow the change in surface contour as the deflection occurs and as the relaxed condition returns.

The sealing means used, in addition to the pad, includes a sealing member disposed around the peripheral edge of the pad which is entrapped and made effective in mounting the plate on the holder body.

The means disclosed in U.S. Pat. No. 3,202,432, for creating a fluid pressure condition in a cylinder, passageway and chamber area space, and of adjusting it, are adopted and incorporated herein by reference. The advantage of being able to use like components in assemblies, with no great change or difference, means considerable savings in volume production for the broad range of expansible tooling envisioned.

DESCRIPTION OF THE DRAWINGS

FIG. 1 is a top plan view of an expanding flat holder device made in accord with the teachings of the present invention.

FIG. 2 is a cross-sectional view of the holder device shown in the first drawing figure as seen in the plane of line 2-2 thereon and looking in the direction of the arrows.

FIG. 3 is a top plan view of the holder device with the slotted cover plate removed, and other parts shown in fragmentary section, as seen in the plane of line 3-3 in the second drawing figure.

FIG. 4 is a cross-sectional view of the holder device shown in the first drawing figure as seen in the plane of line 4-4 thereon and looking in the direction of the arrows.

FIG. 5 is a centerline cross-sectional view of another form of work holder device embodying the teachings of the present invention.

FIG. 6 is an end view of the holder device shown in FIG. 5 with a fragmentary part broken away to better illustrate certain structural features.

FIG. 7 is a fragmentary cross-sectional view of the holder device shown in the fifth drawing figure as seen in the plate of line 7-7 thereon and looking in the direction of the arrows.

FIG. 8 is a side elevation view of still another form of holder device embodying the principles of the present invention with a fragmentary part broken away at one end and shown in cross section.

FIG. 9 is a fragmentary view of the end of the holder device shown in the eighth drawing figure with a part broken away and shown in cross section to better illustrate certain structural features.

FIG. 10 is an end view of the holder device shown in the eighth drawing figure with certain parts removed to better show structural features.

DETAILED DESCRIPTION OF THE ILLUSTRATED EMBODIMENTS

The holder device shown in drawings FIGS. 1—4 is best described as an expanding flat 10, which includes a surface plate 12 which has a center slotted area 14 provided by slots 16 that are arranged in parallel and transverse relation and include stress relief 18 at their opposite ends.

The slotted plate 12 is secured by fastener means 20 to a body member 22 which is formed to include bore holes 24 and 26 for actuating and adjusting means (only the latter of which is shown, and will later be described). Cylindrical chamber areas 28 and 30 are provided at the ends of the bore holes 24 and 26, and these, in turn, communicate with passageways 32 and 34 leading to a chamber area 36 which is relatively shallow and disposed immediately under the slotted center area 14 of the surface plate 12.

The actuating means which is received within the bore 24 is essentially that which is shown and described in U.S. Pat. No. 3,202,432 for use in producing a fluid pressure condition within the communicating chamber and passageway areas last described, and particularly the chamber area 36 under the center slotted area 14 of the surface plate 12. The adjusting means within the borehole 26 includes a piston member 38, with suitable fluid-pressure-sealing rings or like seals 40, that is disposed in the cylinder chamber area 30 and is axially adjustable by a threaded plug 42 in the borehole 26 and which is provided with an allen head recess 46 for adjustment purposes.

The relatively shallow recessed chamber area space 36 in the body member 22 is provided with a shoulder area depression 48 circumferentially therearound to receive and support a nylon pad 50 and an annular sealing member 52, which is disposed circumferentially therearound. These two, together, close the chamber area space 36, and the communicating chamber and passageway areas, so that the actuating means within the bore 24 is capable of producing a fluid pressure condition within the chamber area 36 which, in turn, may be regulated by the adjustment means within the bore 26, through linear placement of the piston member 38 in the cylindrical chamber area 30, as previously described.

It will be appreciated that the annular sealing member 52 fits closely within the annular space between the pad 50 and the shoulder wall of the ledge that receives and supports the pad 50 over the chamber area 36. It will also be appreciated that the annular sealing member 52 is compressed into sealing engagement with all next adjacent surfaces when the plate 12 is mounted on the body member 22.

The foregoing description of the expanding flat holder 10, indicates that the fluid pressure condition created in the chamber area space 36 will act on pad 50 and through it on the center slotted area 14 of the surface plate 12. The pad 50 is of a material responsive to the fluid pressure condition in the chamber area space 36 and capable of transmitting the fluid pressure condition to the slotted area of the plate 12 and of sufficiently uniformly distributing the force to allow the relieved area of the surface plate 12 to be deflected out of its normal flat plane. As the slotted area of the plate 12 yields, the pad follows its change in surface contour, because of its own ability to do so, while still serving as a sealing means over the chamber area space 36.

As the pressure condition is relieved in the chamber area space 36, both the slotted area of the surface plate 12 and the pad 50 return to their normal flat and planar description.

In FIGS. 5—7 a holder device 60 is shown which is generally similar to the one shown in the previous drawing figures and just described. Accordingly, where appropriate, like reference numerals with a distinctive prefix are used to identify similar structure so as to afford a continuity of discussion without unnecessary repetition of description details.

The body member 122, of the holder 60, is formed to provide the chamber area space 136 near one end and has the slotted surface plate 112 provided thereover, and fastened to the body member by dovetail ways or guides 62 and 64 retained by threaded fastener means 66.

Whereas the expanding flat holder 10, previously described, is adapted to hold a work member against an overlying or parallel spaced flat surface, the holder 60 is a more self-contained device in that the dovetail ways 62 and 64 will serve as guides for a workpiece, or other member, and the inwardly converging and overhanging ways provide surfaces against which such a member can be clamped and hold upon pressure-responsive actuation and deflection of the slotted surface plate 112, lying thereunder.

In FIGS. 8—10 a holder device 70 is shown which represents a third embodiment of the present invention. As before, like reference numerals with a distinctive prefix are used to identify similar structure.

In the holder 70, dovetail ways or guides 72 and 74 are provided on the end of the holder body member 222. In this instance, one of the dovetail guides 72 is formed on one edge of the surface plate member 212, as a part thereof, while the other dovetail way 74 is separately retained and attached by means not shown elsewhere on the body member 222. In this embodiment it will also be noted that the slotted plate member 212 is formed to include an edge flange 76 which is retained by separate fastener means relatively under the dovetail way 74 and apart from the clamping surface area of the slotted plate member 212.

As is shown in the holders 60 and 70, the actual location and disposition of the fluid pressure actuating and adjustment means within the body members of different holders is principally a matter of choice. They may be in parallel spaced relation, as shown in the first embodiment, or transversely disposed, as shown in the holder 70.

From the particular preferred embodiments shown and described, it will be appreciated that numerous modifications may be resorted to without departing from the scope of the invention as defined in the following claims.

I claim:

1. An expandable flat holder comprising a holder body, a flat plate mounted on said holder body with a fixed perimeter and having a central area slotted through to facilitate relative deflection out of the normal plane thereof, means defining a sealed fluid pressure chamber area in said body member next adjacent the slotted area of said plate, said means including a fluid-pressure-responsive deflectable sealing pad covering the slotted area of said plate, sealing means provided circumferentially around said pad which is compressed and made operative in the mounting of said plate on said holder body, and means for establishing a fluid pressure condition in said chamber area for actuating said pad in deflecting engagement with the slotted central area of said plate.

2. The holder of claim 1 wherein said chamber area includes a ledge for supporting and retaining said pad in close proximity to the slotted area of said plate.

3. The holder of claim 2 wherein a shoulder wall on said ledge provides an annular space beyond the peripheral edge of said pad as received on said ledge, and said sealing means is provided in said annular space on said ledge and compressed into sealing engagement with all next adjacent surfaces in the mounting of said plate on said holder body.

4. The holder of claim 3 wherein said pad is of relatively more flexible material than said plate so as to conform to the deflected contour of the slotted area of said plate.

5. The holder of claim 1 wherein said holder body includes a flat surface area having a shallow recess formed therein for providing said pressure chamber area, and said plate includes a peripheral area about said slotted center area for fastener attachment to the flat surface area of the holder body circumferentially about said chamber area recess.

6. The holder of claim 1 including, means fastened to said holder body and disposed in spaced and overhanging relation to the slotted central area of said plate for cooperation therewith in the deflected actuation thereof.

7. The holder of claim 6, wherein said overhanging means and said plate are fastened to said holder body by common fastener means.